(12) United States Patent
Mizushima et al.

(10) Patent No.: US 8,372,346 B2
(45) Date of Patent: Feb. 12, 2013

(54) APPARATUS FOR PRODUCING TRICHLOROSILANE

(75) Inventors: Kazuki Mizushima, Saitama (JP); Wataru Saiki, Hitachinaka (JP); Naoya Murakami, Naka-gun (JP); Masami Miyake, Naka-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 154 days.

(21) Appl. No.: 13/047,214

(22) Filed: Mar. 14, 2011

(65) Prior Publication Data
US 2011/0223074 A1  Sep. 15, 2011

(30) Foreign Application Priority Data

Mar. 15, 2010 (JP) ................. 2010-057449

(51) Int. Cl.
*B01J 19/00* (2006.01)
*C01B 33/08* (2006.01)
(52) U.S. Cl. .................. 422/198; 422/199; 423/342
(58) Field of Classification Search .................. 422/198, 422/199; 423/342
See application file for complete search history.

(56) References Cited

U.S. PATENT DOCUMENTS

| | | | |
|---|---|---|---|
| 4,536,642 A | 8/1985 | Hamster et al. | |
| 5,422,088 A | 6/1995 | Burgie et al. | |
| 5,906,799 A | 5/1999 | Burgie et al. | |
| 2004/0173597 A1 | 9/2004 | Agrawal et al. | |
| 2007/0073075 A1 | 3/2007 | Paetzold et al. | |
| 2009/0155140 A1 | 6/2009 | Ishii et al. | |

FOREIGN PATENT DOCUMENTS

| | | |
|---|---|---|
| EP | 2003092 A1 | 12/2008 |
| EP | 2014618 A1 | 1/2009 |
| JP | 60-49021 B2 | 1/1982 |
| JP | 3781439 B2 | 10/1994 |
| JP | 2004-262753 A | 9/2004 |
| JP | 2008-133170 A | 6/2008 |

OTHER PUBLICATIONS

European Search Report dated May 25, 2011, issued for the corresponding European patent application No. 11158076.7.

*Primary Examiner* — Walter D Griffin
*Assistant Examiner* — Lessanework Seifu
(74) *Attorney, Agent, or Firm* — Edwards Wildman Palmer LLP

(57) ABSTRACT

In an apparatus for producing trichlorosilane, an internal space of a reaction chamber is partitioned in a radial direction by first walls running along a circumferential direction, and is partitioned into multiple spaces by second walls which extend in a direction crossing the circumferential direction. Upper portions or lower portions of the first walls and the second walls are formed with a communicating portion which circulates a raw material gas to be introduced, toward a central portion of a reaction chamber while the raw material gas goes through the small spaces sequentially and is turned up and down, heaters are installed in the small spaces, one of small spaces on both sides of the second walls is used as a small space for a upward flow passage, and the other is used as a small space for a downward flow passage, and the small spaces communicate with each other via the communication portion of the second walls.

4 Claims, 7 Drawing Sheets

APPARATUS FOR PRODUCING TRICHLOROSILANE

BACKGROUND OF THE INVENTION

1. Field of the Invention

The present invention relates to an apparatus for producing trichlorosilane which converts silicon tetrachloride into trichlorosilane.

Priority is claimed on Japanese Patent Application No. 2010-057449 filed on Mar. 15, 2010, the contents of which are incorporated herein by reference.

2. Description of Related Art

Trichlorosilane ($SiHCl_3$), which is used as a raw material for the production of silicon (Si), can be produced by conversion through a reaction of silicon tetrachloride ($SiCl_4$) with hydrogen.

That is, silicon is produced in a reductive reaction and a thermal decomposition of trichlorosilane represented by the following reaction formulas (1) and (2). Trichlorosilane is produced in a conversion reaction represented by the following formula (3).

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

As an apparatus which produces trichlorosilane, for example, in Japanese Patent No. 3781439 and Japanese Unexamined Patent Application First Publication No. 2004-262753, a reaction container is suggested in which a reaction chamber is designed as a double chamber having an outer chamber and an inner chamber by two pipes which are concentrically arranged, and a heating element is arranged around the outside of the reaction chamber. In this reaction container, the heating element formed from carbon or the like produces heat by applying a current and heats the inside of the reaction chamber from the outside, whereby the gas within the reaction chamber is made to react.

On the other hand, Japanese Unexamined Patent Application First Publication No. 2008-133170 suggests an apparatus for producing trichlorosilane in which a reaction container is constituted by a plurality of concentric cylindrical walls and a disc which closes the upper and lower sides of the small spaces between these cylindrical walls, the respective small spaces are made to communicate with each other continuously, and used as a reaction chamber, and a heating element is provided inside the cylindrical wall at the innermost circumferential position.

Japanese Examined Patent Application Second Publication No. S60-49021 discloses an apparatus of the structure in which a plurality of tubular heaters is arranged in a reaction chamber, and gas is directly heated within the reaction chamber and the heaters.

SUMMARY OF THE INVENTION

Problems to be Solved by the Invention

The apparatus for producing trichlorosilane needs to heat the inside of the reaction chamber to the reaction temperature of trichlorosilane effectively with high thermal efficiency.

However, in the structures in described in Japanese Patent No. 3781439 and Japanese Unexamined Patent Application First Publication No. 2004-262753, the inside of the reaction chamber is heated by the heating element arranged outside the reaction chamber. However, there are disadvantages that the radiant heat released radially outward from the heating element cannot be effectively used, and the thermal efficiency is low.

Additionally, in the case of the structure described in Japanese Unexamined Patent Application First Publication No. 2008-133170, the heating element is provided at a central portion of the reaction container. Thereby the whole radiant heat released radially outward can be applied to the gas within the reaction chamber, and can be heated with higher thermal efficiency than that in described in Japanese Patent No. 3781439 and Japanese Unexamined Patent Application First Publication No. 2004-262753. In a case where the apparatus is enlarged to make the external diameter of the reaction chamber larger for an increase in the amount of production, the outer circumferential portion of the reaction chamber cannot be heated because the outer circumferential portion becomes far from the heating element, and there is a limit to enlargement of the apparatus itself.

Moreover, in Japanese Patent No. 3781439, Japanese Unexamined Patent Application First Publication No. 2004-262753, and Japanese Unexamined Patent Application First Publication No. 2008-133170, respective reaction chambers are concentrically configured. As a result, it is necessary to make an outer reaction chamber have a narrower volume than an inner reaction chamber in order to prevent heating efficiency from declining by a decrease in the velocity of the gas. However, in order to increase the amount of throughput when the heaters are installed even in the reaction chamber as described in Japanese Examined Patent Application Publication No. 60-49021, it is difficult to arrange the heaters between outer reaction chambers because of the narrow spacing.

Additionally, in these apparatuses for producing trichlorosilane, generally, a carbon member which is coated with silicon carbide for prevention of generation of impurities at a high temperature is used for the reaction container or the heater. However, since enlargement of the carbon member which is a brittle material is difficult, enlargement of the producing apparatus itself is also difficult.

The present invention has been made in consideration of the aforementioned problems, and the object thereof is to provide an apparatus for producing trichlorosilane which can heat supplied gas with high thermal efficiency, can achieve enlargement of an apparatus without impairing thermal efficiency, and enables mass production.

Means for Solving the Problem

The present invention is an apparatus for producing trichlorosilane from a raw material gas containing silicon tetrachloride and hydrogen. The apparatus includes a reaction chamber which is supplied with the raw material gas in order to produce a reaction gas containing trichlorosilane and hydrogen chloride; and heaters provided in the reaction chamber. An internal space of the reaction chamber is partitioned into a plurality of cells in a radial direction by first walls running along a circumferential direction. At least one of the cells formed by the first walls is partitioned into a plurality of cells by second walls which extend in a direction crossing the circumferential direction. The internal space of the reaction chamber is formed with small cells partitioned between the first walls and/or small cells partitioned by the first walls and the second walls. The small cell is brought into a communication state so as to circulate the raw material gas toward a central portion of the reaction chamber while the direction of flow thereof is changed by turning up and down the raw material gas by a communication portion formed at upper portions or lower portions of the first walls and/or the second walls which partition the small cells. The heaters are installed in at least one of the small space. Small cells for upward flow passages and small cells for downward flow passages are made to communicate with each other in the circumferential direction by the communication portion formed in the second walls.

According to this apparatus for producing trichlorosilane, the heat released from the heaters is directly transferred to the raw material gas which passes through the small cells as the heaters are installed in the respective small cells. Thus, the raw material gas can be heated with high thermal efficiency. Additionally, the internal space of the reaction chamber is provided with the first walls running along the circumferential direction, and the second walls extending in a direction crossing the circumferential direction, and these walls receive radiant heat and become heating members. As a result, the area which heats the raw material gas increases, so that efficient heating can be performed.

Additionally, as mentioned above, in the apparatuses for producing trichlorosilane shown in Japanese Patent No. 3781439, Japanese Unexamined Patent Application First Publication No, 2004-262753, and Japanese Unexamined Patent Application First Publication No. 2008-133170, respective reaction chambers are concentrically configured. Therefore, it is necessary to make an outer reaction chamber have narrower spacing than an inner reaction chamber in order to keep the flow velocity of a reaction gas from becoming too slow. As a result, it is difficult to arrange the heaters because of the narrow spacing. In the apparatus for producing trichlorosilane of the present invention, the small cells are partitioned by not only the circumferential first walls, but also the second walls which extend in the direction crossing the circumferential direction. Therefore, the small cells can be formed with a width and shape capable of installing a required number of heaters, and the cross-sectional area can be appropriately adjusted so that a desired gas flow velocity can be obtained.

Moreover, the walls which constitute the reaction chamber and the internal space thereof can be configured by connecting together a plurality of wall bodies with the area surrounding portions of the respective small cells. Thereby, even if a member, such as the carbon member whose enlargement is difficult, a large-sized apparatus can be configured by combining small members together.

Additionally, in the apparatus for producing trichlorosilane of the present invention, each of the small cells may be provided such that only an inflow-side small cell from which the raw material gas flows out and an outflow-side small cell into which the raw material gas flows out are adjacent to the small cell concerned.

In the apparatus for producing trichlorosilane of the present invention, the respective small cells through where the raw material gas which is gradually heated circulates are arranged so as to be adjacent to each other in a circulation order. Thereby, the raw material gas of each of the small cells is not adjacent to the raw material gas which is remarkably lower than the temperature thereof. For this reason, the raw material gas is not remarkably cooled via the walls from adjacent small cells, and the temperature thereof can be reliably and rapidly raised. Additionally, since the temperatures of the reaction gas are not equalized between the small cells, it is possible to set the heater temperature in each of the small cells so as to correspond to each reaction gas temperature, which is efficient.

Moreover, in the apparatus for producing trichlorosilane of the present invention, each of the small cells may not be adjacent to a small cell which forms the flow of the raw material gas before two or more or after two or more.

Thereby, since a difference in temperature between the raw material gases within adjacent small cells becomes small, the temperature is more reliably and rapidly raised.

Also, in the apparatus for producing trichlorosilane of the present invention, joining portions between the first walls and the second walls in the reaction chamber and the small cells may be provided with supporting members which come into contact with a bottom plate and top plate of the reaction chamber.

A heat exchanger which performs heat exchange between the raw material gas introduced into a reaction vessel and the reaction gas discharged from the reaction vessel is installed above the reaction chamber. In the present invention, in that case, the weight of the heat exchanger can be supported by the plurality of supporting members within the reaction chamber to reduce the weight burden of the first walls and the second walls. Therefore, it is possible to take an easy measure even in a case where a heat exchanger is enlarged along with enlargement of the apparatus, or multiple heat exchangers are provided.

Effect of the Invention

According to the apparatus for producing trichlorosilane related to the present invention, the heaters are installed within the reaction chamber. Thereby, the heat from the heaters can be directly transferred to the raw material gas, and the raw material gas can be heated with high thermal efficiency. Additionally, by partitioning the inside of the reaction chamber into small cells, the cross-sectional area of the small cells can be a cross-sectional area with which a desired gas velocity can be obtained, and the heaters can also be installed, and enlargement of the apparatus can be achieved without impairing heat efficiency.

DETAILED DESCRIPTION OF THE INVENTION

One embodiment of an apparatus for producing trichlorosilane related to the present invention will be described below.

Figure 1:
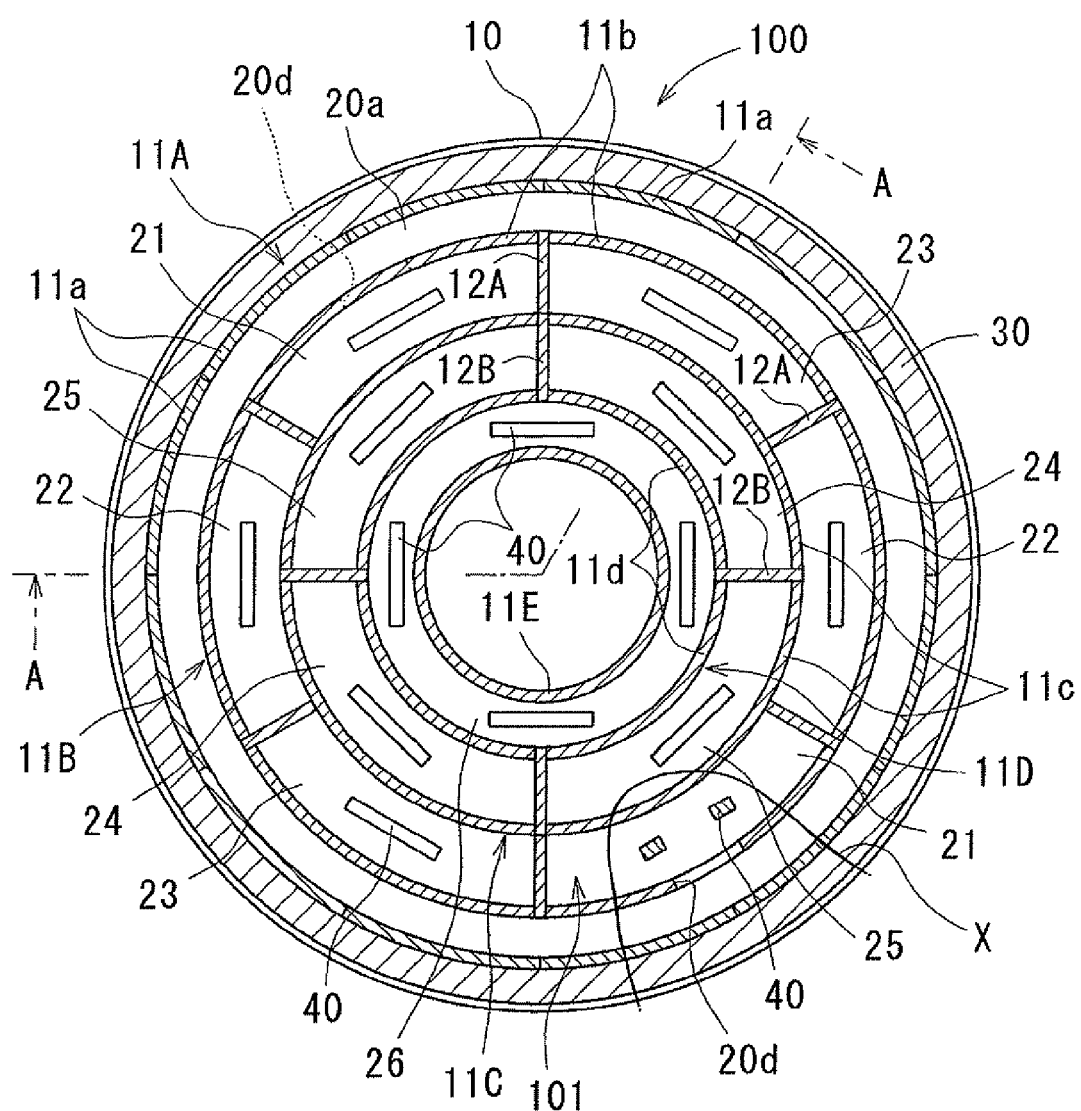
FIG. 1 is a transverse sectional view showing a first embodiment of an apparatus for producing trichlorosilane of the present invention.
Figure 2:
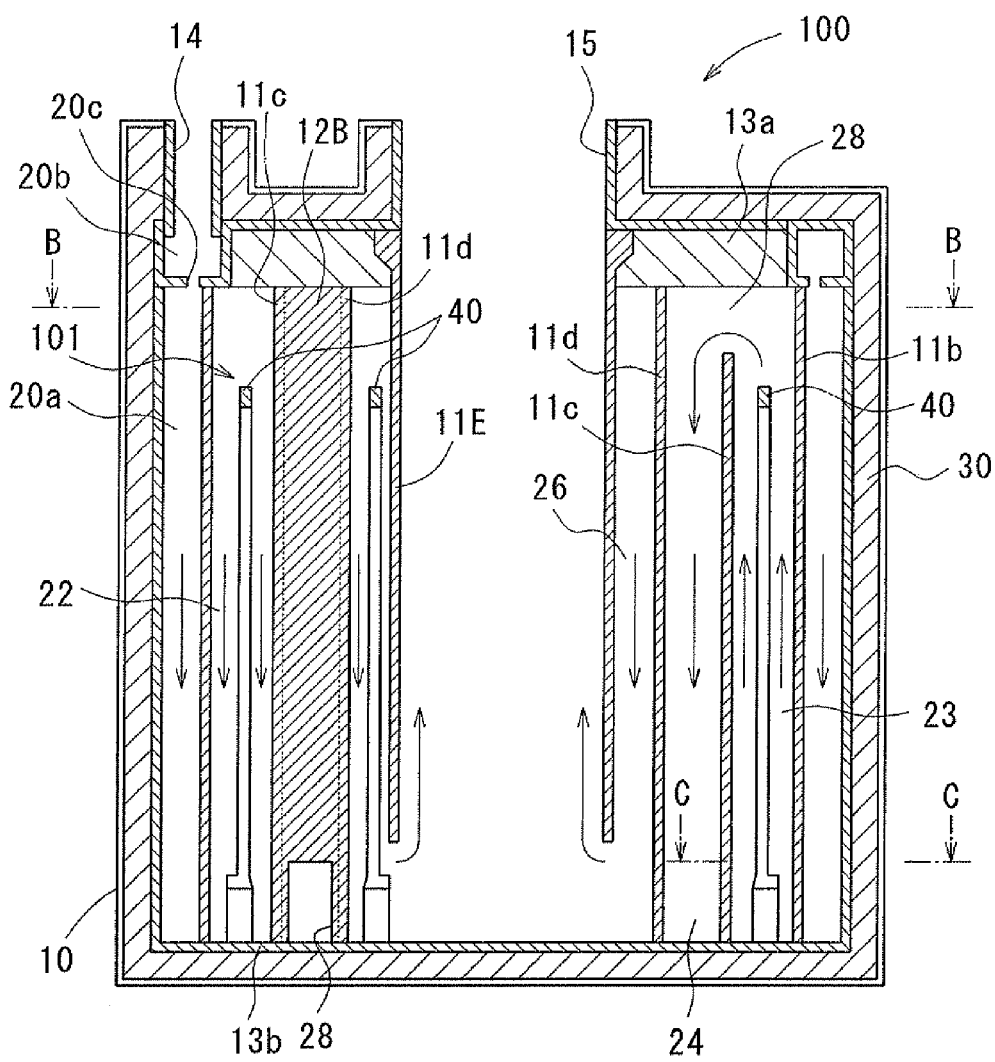
FIG. 2 is a sectional view taken along the line A-A in FIG. 1.

The apparatus 100 for producing trichlorosilane of the present embodiment is an apparatus which heats a raw material gas containing silicon tetrachloride and hydrogen to produce a reaction gas containing trichlorosilane and hydrogen chloride by a conversion reaction, thereby producing trichlorosilane, and as shown in FIGS. 1 and 2, includes a reaction container 10 to which the raw material gas is supplied, and a plurality of heaters 40 which is provided in the reaction container 10 to heat the raw material gas.

Although FIG. 1 is a sectional view taken along the line B-B shown in FIG. 2, a portion X surrounded by a break line X is shown in a cross-section along the line C-C of FIG. 2.

The reaction container 10 includes a heat insulating container 30, and a decline in heating efficiency, which is caused as the heat from the heaters 40 is released from the reaction container 10, is prevented. Also, the reaction container 10 includes a substantially tubular wall 11A, a top plate 13a which closes an upper end of an internal space of the wall 11A, and a bottom plate 13b which closes a lower end. And the space surrounded by the wall 11A, the top plate 13a, and the bottom plate 13b be formed as a reaction chamber 101 in the apparatus 100 for producing trichlorosilane.

Additionally, the outside of the reaction chamber 101 is covered with a substantially cylindrical heat insulating container 30.

The internal space of the reaction chamber 101, as shown in FIG. 1, is partitioned into a cylindrical flow passage 20a at an outermost circumferential position and small cells 21 to 26 inside the flow passage 20a, by first walls 11A to 11E which are arrayed in a concentric fivefold tubular shape, second walls 12A and 12B which extend in a direction orthogonal to the first walls 11A to 11E. The first walls 11A to 11E and the second walls 12A and 12B are made of carbon, and the surfaces thereof are coated with silicon carbide. Additionally, the first walls 11A to 11D are configured by combining arcuate wall bodies 11a to lid in the circumferential direction.

A communication portion 28 which allows the raw material gas to communicate between adjacent small cells 21 to 26 is formed above or below the first walls 11B to 11E and the second walls 12A and 12B which constitute the small cells 21 to 26, respectively. The small cells 21 to 26 are brought into a state of communicating with each other by the communication portion 28 in this order.

Also, small cells 21 to 25 with an arcuate cross-section are concentrically arranged in two rows inside the outermost cylindrical flow passage 20a, and a ring-shaped small cell 26 is arranged on the innermost side. Among the small cells 21 to 26, the small cells 21, 23, and 25 are small cells for upward flow passages through which the raw material gas circulates upward in FIG. 2, and the small cells 22, 24, and 26 are small cells for downward flow passages through which the raw material gas circulates downward. The "upward" is a direction facing toward the top plate 13a from the bottom plate 13b, and the "downward" is a direction facing toward the bottom plate 13b from the top plate 13a. The small cells 21 to 26 are configured such that the raw material gas is made to go through the small cells 21, 23, and 25 for upward flow passages and the small cells 22, 24, and 26 for downward flow passages alternately and sequentially and is turned up and down through the communication portion 28, and thereby circulates toward a central portion of the reaction chamber 101 while the direction of flow thereof is changed in every small cell.

Additionally, in the small cells 21 to 23 partitioned between the first walls 11B and 11C by the second wall 12A, the raw material gas circulates along the circumferential direction sequentially from the small cell 21. Additionally, similarly, even in the small cells 24 and 25 partitioned between the first walls 11C and 11D by the second wall 12B, the raw material gas circulates along the circumferential direction to the small cell 25 from the small cell 24. The communication portion 28 is formed in the second walls 12A and 12B which forms the small cells 21 to 25. But the communication portion is not provided in the second walls 12A and 12B arranged in the directions of 0° and 180° on the sheet of FIG. 1.

That is, in the first embodiment, in a cylindrical space formed between the first walls 11B and 11C arranged in a concentric tubular shape, two second walls 12A in which the communication portion is not provided are installed so as to intersect a tangential line of both the first walls 11B and 11C perpendicularly, and two semi-arc spaces with a semi-arc (central angle of 180°) cross-section are formed. Moreover, in these semi-arc spaces, the second wall 12A in which the communication portion 28 is provided so as to intersect the tangential line of both the first walls 11B and 11C perpendicularly, and partitions these semi-arc spaces into the small cells 21 to 23 having an arcuate (0°<central angle)<180° cross-section.

Additionally, in a cylindrical space formed between the first walls 11C and 11D arranged in a concentric tubular shape, two second walls 12B in which the communication portion is not provided are installed so as to intersect a tangential line of both the first walls 11C and 11D perpendicularly, and two semi-arc spaces with a semi-arc (central angle of 180°) cross-section are formed. Moreover, in these semi-arc spaces, the second wall 12B in which the communication portion 28 is provided so as to intersect the tangential line of both the first walls 11C and 11D perpendicularly, and partitions these semi-arc spaces into the small cells 24 and 25 having an arcuate (0°<central angle)<180° cross-section.

The cylindrical flow passage 20a at the outermost circumferential position is a cylindrical space between the first wall 11B, and the first wall 11A arranged on the outer circumferential side of the first wall 11B. The small cell 26 is a ring-shaped cell between the first wall 11D, and the first wall 11E arranged on the inner circumferential side of the first wall 11D.

When the circulation order of the raw material gas from the cylindrical flow passage 20a to the small cell 26 are shown by reference numerals of FIG. 1, the circulation order is as follows: cylindrical flow passage 20a→small cell 21→small cell 22→small cell 23→small cell 24→small cell 25→small space 26.

A cylindrical space (cylindrical flow passage 20a) is formed between the first walls 11A and 11B of a outer circumferential portion of the reaction chamber 101, and an annular flow passage 20b is connected to an upper portion of the cylindrical flow passage 20a. The annular flow passage 20b and the cylindrical flow passage 20a communicate with each other by a slit 20c running along the circumferential direction thereof. Also, a raw material gas supply pipe 14 is connected to an upper portion of the annular flow passage 20b. Additionally, a gas outlet port 15 through which a reaction gas is discharged to the outside of the apparatus is connected so as to penetrate the center of the top plate 13a which closes the upper end of the reaction chamber 101.

Although a bottom end of the first wall 11B is connected to the bottom plate 13b, a portion thereof is formed with a gas introduction port 20d through which the raw material gas is introduced into the small cell 21.

In the small cells 21 to 26, the heaters 40 which extend in the up-and-down direction along the first walls 11B to 11E are installed. Each of the plurality of heaters 40 which heats the raw material gas within the reaction chamber 101 is composed of a heating element which is fixed to a pair of electrodes and performs resistance heating by applying a current, and is formed in the shape of a vertically inverted U-shaped plate which extends to the upper end of the small cell. The heaters 40 are made of carbon, and the electrodes and the heaters 40 are coated with silicon carbide which covers the surfaces thereof.

In the apparatus 100 for producing trichlorosilane configured as described above, the raw material gas, which has been supplied to the reaction chamber 101 from the raw material gas supply pipe 14, fills an annular flow passage 20b, and is then introduced into the cylindrical flow passage 20a, and is introduced to the lower portion of the small cell 21 within the reaction chamber 101 through gas introduction port 20d.

The raw material gas introduced into the reaction chamber 101 is, for example, 400° C. to 700° C., and is heated by the heaters 40 while passing through the small cells 21 to 26. At this time, since the first walls 11B to 11E and second walls 12A and 12B surrounding the heaters 40 receive the heat of the heaters 40 installed within the small cells 21 to 26, and are heated to a high temperature, the raw material gas is heated even by the first walls 11B to 11E and the second walls 12A and 12B. The reaction gas produced by the conversion reaction of the heated raw material gas is, for example, 800° C. to 1100° C., and is taken out from the apparatus 100 for producing trichlorosilane through the gas outlet port 15.

As described above, according to this apparatus 100 for producing trichlorosilane, the heat released from the heaters 40 is directly transferred to the raw material gas which passes through the small cells 21 to 26 as the heaters 40 are installed in the small cells. Thus, the raw material gas can be heated with high thermal efficiency. Additionally, the internal space of the reaction chamber 101 is provided with the plurality of first walls 11A to 11E running along the circumferential direction, and the second walls 12A and 12B extending in a direction crossing the circumferential direction, and these walls receive radiant heat and become heating members. As a result, the area which heats the raw material gas increases, so that efficient heating can be performed.

Additionally, the first walls 11A to 11D which constitute the reaction chamber 101 and the small cells 21 to 26A are configured by connecting the arcuate wall bodies 11a to 11d together, and even if a brittle material which is difficult to mold integrally into a large-sized apparatus, such as a carbon member, is used a large-sized apparatus can be configured by combining small members as in the trichlorosilane apparatus 100 of the present embodiment.

Additionally, in the apparatus 100 for producing trichlorosilane of the present embodiment, the small cells 21 to 26 are partitioned by not only the circumferential first walls 11B to 11E, but also the second walls 12A and 12B which extend in the direction crossing the circumferential direction. Therefore, the small cells 21 to 26 can be freely formed with a width and shape capable of installing a required number of heaters 40, and the cross-sectional area of each of the small cells 21 to 26 can be appropriately adjusted so that a desired gas flow velocity can be obtained in accordance with the reaction state of the raw material gas.

Figure 3:
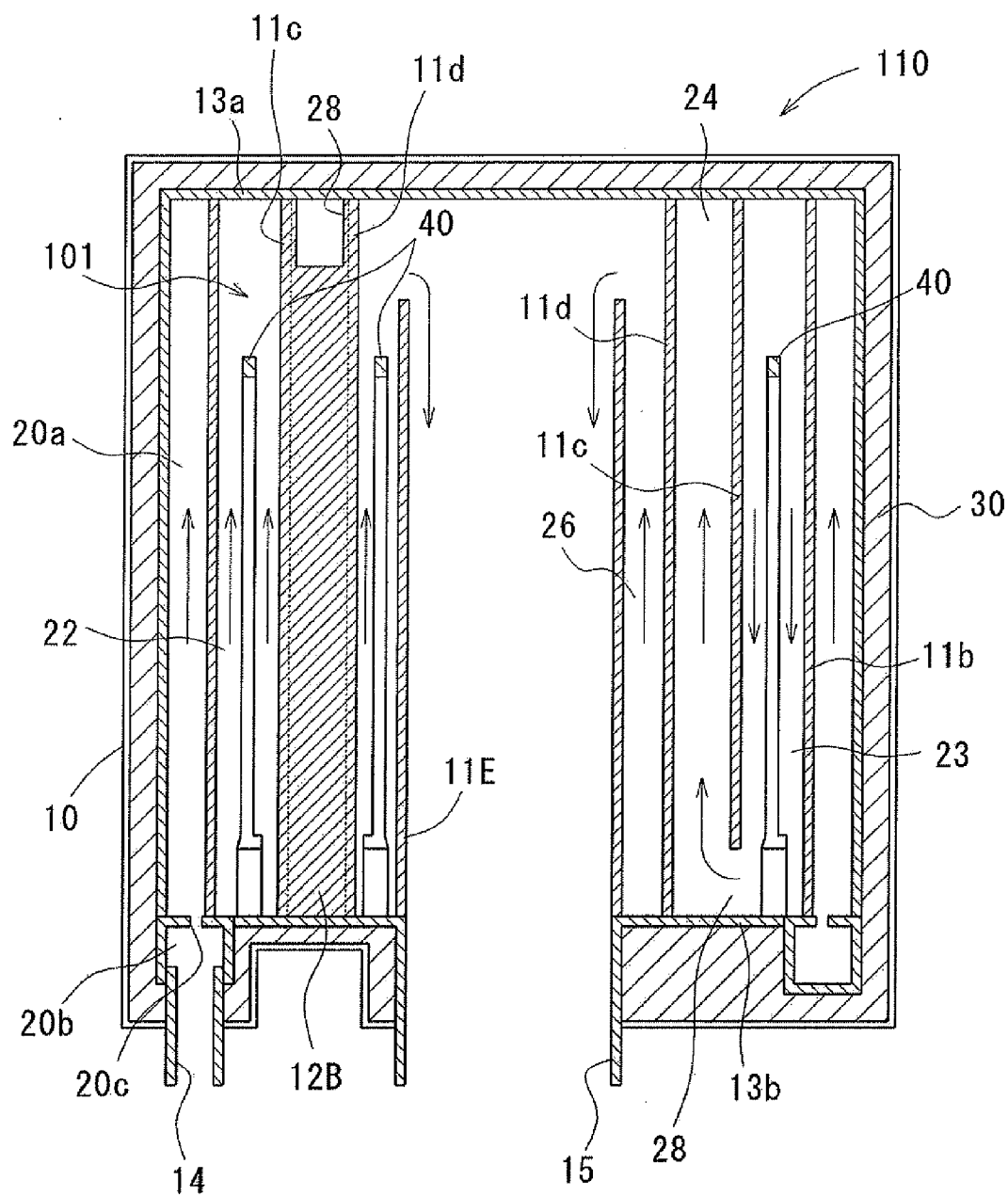
FIG. 3 is a longitudinal sectional view of the apparatus for producing trichlorosilane in which the arrangement of a raw material gas supply pipe and a gas outlet port is changed.

In addition, in the above-described first embodiment, the raw material gas supply pipe 14 and the gas outlet port 15 are provided above the reaction chamber 101, the raw material gas is introduced into the reaction chamber 101 from the cylindrical flow passage 20a through the raw material gas supply pipe 14 and the reaction gas produced within the reaction chamber 101 is taken out from the apparatus 100 for producing trichlorosilane through the upper gas outlet port 15. However, as in the apparatus for producing trichlorosilane 110 shown in FIG. 3, the raw material gas supply pipe 14 and the gas outlet port 15 may be provided below the reaction chamber 101. Additionally, the present invention is not limited to the configuration in which the raw material gas supply pipe 14 and the gas outlet port 15 are installed in accordance with either the upward direction or downward direction of the reaction chamber 101. For example, it is possible to adopt a configuration in which the raw material gas supply pipe 14 is provided above the reaction chamber 101, and the gas outlet port 15 is provided below the reaction chamber 101.

Figure 4:
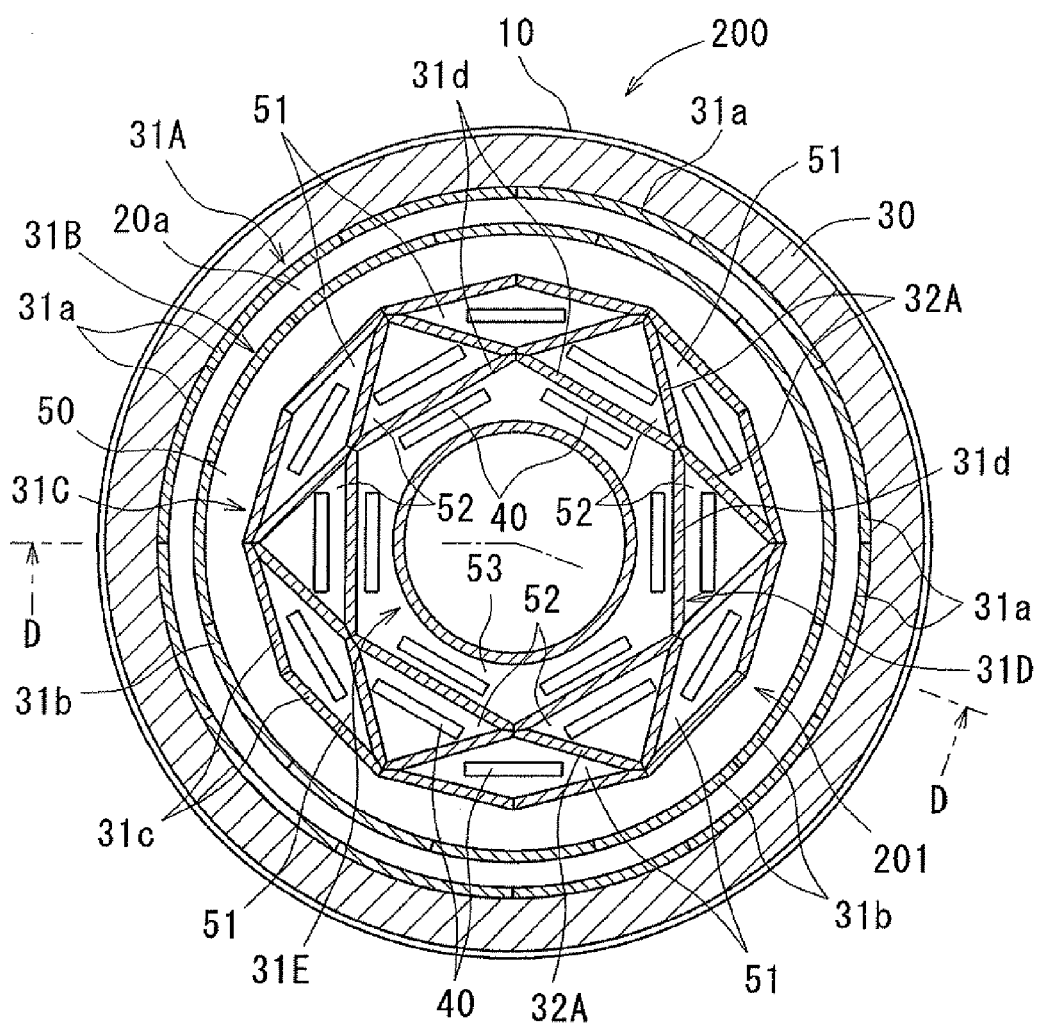
FIG. 4 is a transverse sectional view showing a second embodiment of the apparatus for producing trichlorosilane of the present invention.
Figure 5:
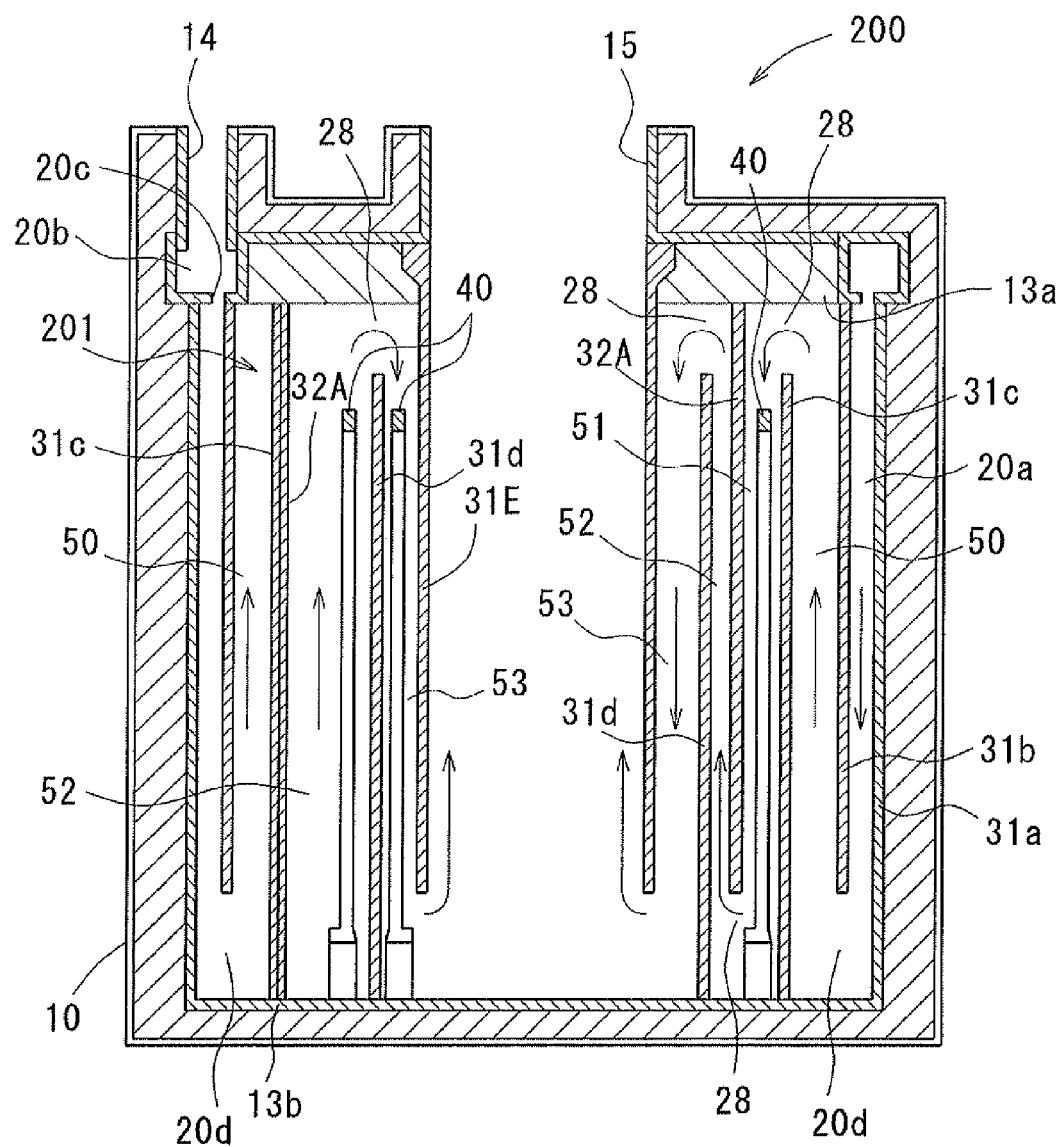
FIG. 5 is a sectional view taken along the line D-D in FIG. 4.

FIGS. 4 and 5 show a second embodiment of the present invention. Although the first embodiment is configured such that the raw material gas circulates to the central portion of the reaction chamber 101 while the small cells 21 to 26 in the reaction chamber 101 communicate with each other in the radial direction and in the circumferential direction, the second embodiment is configured such that the raw material gas circulates through the inside of each of the small cells 50 to 53 so as to always approach a central portion of a reaction chamber 201.

The internal space of the reaction chamber 201 of the apparatus 200 for producing trichlorosilane 200 of the second embodiment, as shown in FIG. 4, is partitioned into small cells 50 to 53 by first walls 31A to 31E which are arranged in a fivefold concentric shape running along the circumferential direction, and a second wall 32A which extends in a direction crossing the circumferential direction while connecting together the first wall 31C and the first wall 31D which are respectively at third and fourth rounds from the outside among the first walls. The first wall 31C at a third round from the outside is formed in a dodecagonal shape, and the first wall 31D at a fourth round from the outside is formed in a hexagonal shape, and the vertexes of these polygons are connected by the second wall 32A. As for the cross-section shape of the small cells 50 to 53, starting from the outside, the ring-shaped small cell 50, the rhomboidal small cell 51, the triangular small cell 52, and the ring-shaped small cell 53 are formed.

The first walls 31A to 31E and the second wall 32A are made of carbon like those of similarly to the first embodiment, and the surfaces thereof are coated with silicon carbide.

The first walls 31A and 31B at first and second rounds which are arranged at the outer circumferential portion of the reaction chamber 201 are configured by combining arcuate wall bodies 31a and 31b, and the first walls 31C and 31D at third and fourth rounds are configured by flat-plate-shaped wall bodies 31c and 31d.

The ring-shaped small cell 50 and the triangular small cell 52 are small cells for upward flow passages through the raw material gas flows upward in FIG. 5, and the rhomboidal small cell 51 and the ring-shaped small cell 53 are small cells for downward flow passages through which the raw material gas flows downward. Additionally, each of the small cells 50 to 53 is provided such that only an inflow-side small cell from which the raw material gas flows out and an outflow-side small cell into from which the raw material gas flows are adjacent to the small cell concerned. The small cells 50 to 53 are configured such that the raw material gas is made to go through the small cells 50 and 52 for upward flow passages and the small cells 51 and 53 for downward flow passages alternately and sequentially and is turned up and down through the communication portion 28, and thereby circulates toward a central portion of the reaction chamber 201 while the direction of flow thereof is changed. In the example shown in FIG. 4, the raw material gas flows from the cylindrical flow passage 20a to the small cell 53 in order of cylindrical flow passage 20a→ring-shaped small cell 50→rhomboidal small cell 51→triangular small cell 52→ring-shaped small cell 53.

In the apparatus 200 for producing trichlorosilane of the second embodiment, the small cells 50 to 53 through where the raw material gas which is gradually heated circulates are arranged so as to be adjacent to each other in a circulation order. Thereby, the raw material gas of each of the small cells 50 to 53 is not cooled by the raw material gas which is remarkably lower than the temperature thereof, and the gas temperature in the gas outlet port 15 of the reaction chamber 201 can be reliably made high. Additionally, since the temperatures of the reaction gas are not equalized between the small cells 50 to 53, it is possible to set the heater temperature in each of the small cells 50 to 53 so as to correspond to each reaction gas temperature, which is efficient.

Since the other configurations are the same as those of the first embodiment, common portions are designated by the same reference numerals, and the description thereof is omitted.

Figure 6:
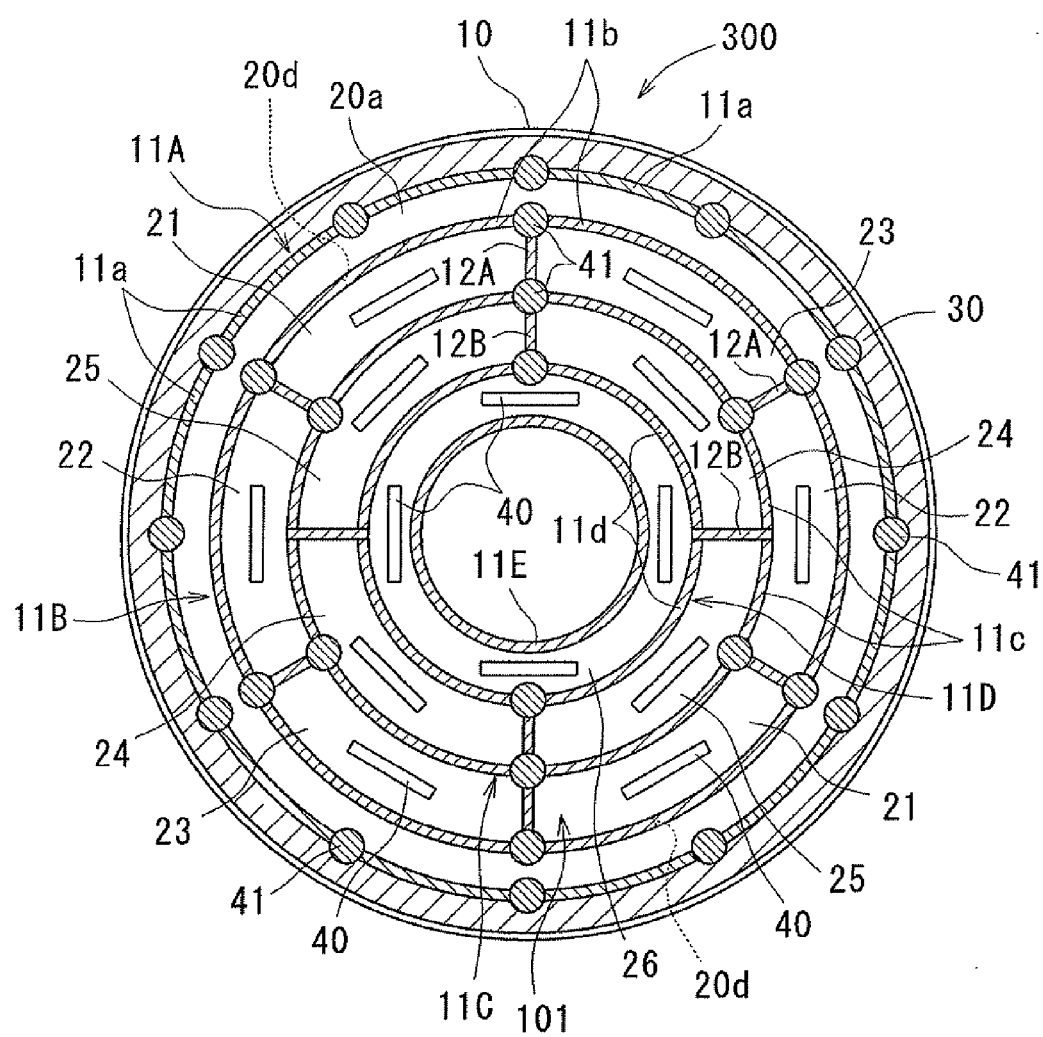
FIG. 6 is a transverse sectional view showing an apparatus for producing trichlorosilane in another embodiment of the present invention.
Figure 7:
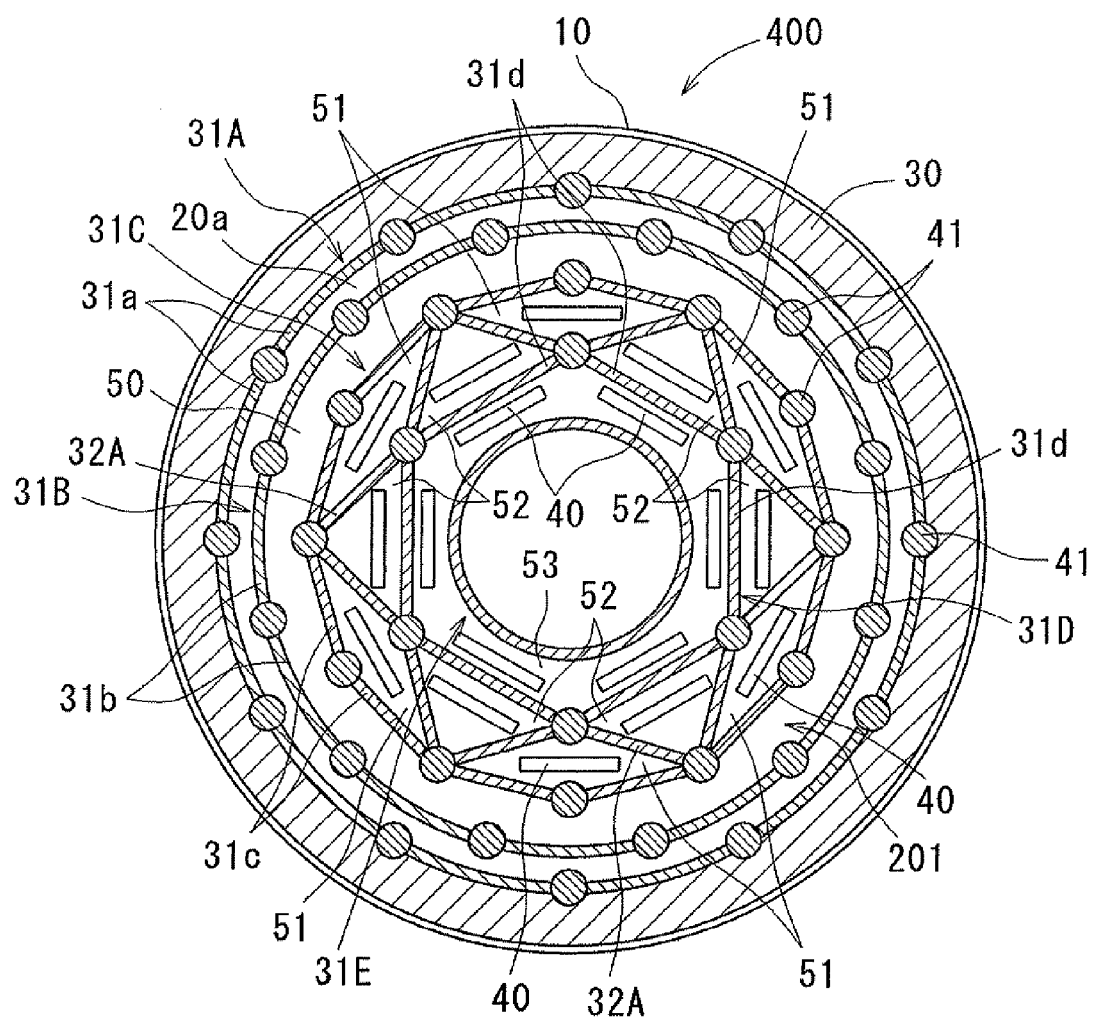
FIG. 7 is a transverse sectional view showing an apparatus for producing trichlorosilane in still another embodiment of the present invention.

FIGS. 6 and 7 show other embodiments of the present invention. In an apparatus 300 for producing trichlorosilane 300 shown in FIG. 6, joining portions between the arcuate wall bodies 11a to 11d which constitute the first walls 11A to 11D and the second walls 12A and 12B of the apparatus 100 shown in FIG. 1, are provided with support members 41. In an apparatus 400 for producing trichlorosilane 400 shown in FIG. 7, joining portions between the arcuate wall bodies 31a and 31b and the flat-plate-shaped wall bodies 31c and 31d which constitute the first walls 31A to 31D of the apparatus 200 shown in FIG. 4, and the second wall 32A are provided with support members 41. The support members 41 come in contact with the top plate 13a and the bottom plate 13b of the reaction chamber, and are configured so as to support the load received from the top plate 13a. Accordingly, even a case where a heat exchanger which performs heat exchange between the raw material gas introduced into a reaction vessel and the reaction gas discharged from the reaction vessel is installed above the top plate 13a, the load can be received by the support members 41.

In addition, the present invention is not limited to the configuration of the above embodiments, but in the detailed configuration, various modifications can be made without departing from the scope of the present invention. For example, the above-described embodiments are configured such that the outer circumferential portion of the reaction chamber 101 or 201 is provided with the cylindrical flow passage 20a and the raw material gas is introduced into the reaction chamber 101 or 201 from the cylindrical flow passage 20a. However, the raw material gas may be directly introduced into the outer small cell 21 or 50 without providing the cylindrical flow passage 20a.

Additionally, in the above-described second embodiment, each of the small cells is provided such that only an inflow-side small cell from which the raw material gas flows out and an outflow-side small cell into which the raw material gas flows out are adjacent thereto. However, the present invention is not limited thereto, and also includes a configuration in which a certain small cell is adjacent to a small cell which is not the inflow-side small cell or the outflow-side small cell, but has the same order of flow as the inflow-side small cell, the outflow-side small cell, or itself. The above statement having the same order of flow means a small cell where the order of flow counted from the cylindrical flow passage 20a is the same. In FIG. 4, the same reference numeral is given to the small cell where the order of flow is the same. That is, it is important that each of the small cells is not adjacent to a small cell which forms the flow of the raw material gas before two or more or after two or more.

That is, small cells which communicate with each other by the communication portion 28 or small cells which are continuous along the circumferential direction without communicating with each other and have the same cross-section may be adjacent to each other. For details, when the small cells are counted as first, second, . . . , nth, . . . from the out side of a reaction chamber (ring-shaped small cell 50) to the central portion of a reaction chamber (ring-shaped small cell 53) along the flow of the raw material gas, it is preferable that nth (n: natural number) small cell adjoins at least one of (n−1)th and (n+1)th small cells, and also that nth small cell does not adjoin (not more than n−2)th small cell and (not less than n+2)th small cell.

In this way, if each small cell is configured so as not to be adjacent to a small cell which forms the flow of the raw material gas before two or more or after two or more, the raw material gas in the respective small cells which are gradually heated is not adjacent to the raw material gas which is remarkably lower than the temperature thereof. Therefore, the temperature of the raw material gas can be efficiently raised.

Additionally, in the second embodiment, the first wall 31C at a third round from the outside is formed in a dodecagonal shape, and the first wall 31D at a fourth round from the outside is formed in a hexagonal shape. The shape of these polygons is not particularly limited.

What is claimed is:

1. An apparatus for producing trichlorosilane from a raw material gas containing silicon tetrachloride and hydrogen, the apparatus comprising:
   a reaction chamber which is supplied with the raw material gas in order to produce a reaction gas containing trichlorosilane and hydrogen chloride; and
   heaters provided in the reaction chamber,
   wherein an internal space of the reaction chamber is partitioned into a plurality of cells in a radial direction by first walls running along a circumferential direction,
   at least one of the cells formed by the first walls is partitioned into a plurality of cells by second walls which extend in a direction crossing the circumferential direction,
   the internal space of the reaction chamber is formed with small cells partitioned between the first walls and/or small cells partitioned by the first walls and the second walls,
   the small cell is brought into a communication state so as to circulate the raw material gas toward a central portion of the reaction chamber while the direction of flow thereof is changed by turning up and down the raw material gas by a communication portion formed at upper portions or lower portions of the first walls and/or the second walls which partition the small cells,
   the heaters are installed in at least one of the small space, and
   small cells for upward flow passages and small cells for downward flow passages are made to communicate with each other in the circumferential direction by the communication portion formed in the second walls.

2. The apparatus for producing trichlorosilane according to claim 1,
   wherein each of the small cells is provided such that only an inflow-side small cell from which the raw material gas flows out and an outflow-side small cell into which the raw material gas flows out are adjacent to the small cell concerned.

3. The apparatus for producing trichlorosilane according to claim 1,
wherein each of the small cells is not adjacent to a small cell which forms the flow of the raw material gas before two or more or after two or more.

4. The apparatus for producing trichlorosilane according to claim 1,
wherein joining portions between the first walls and the second walls in the reaction chamber and around the small cells are provided with supporting members which come into contact with a bottom plate and top plate of the reaction chamber.

* * * * *